US012764388B2

(12) United States Patent
Scott-Green

(10) Patent No.: US 12,764,388 B2
(45) Date of Patent: Oct. 13, 2026

(54) DYNAMIC INTEGRATION OF CUSTOMIZED SUPPLEMENTAL MEDIA CONTENT

(71) Applicant: Google LLC, Mountain View, CA (US)

(72) Inventor: Henry Scott-Green, Marina del Rey, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/902,690

(22) Filed: Sep. 30, 2024

(65) Prior Publication Data

US 2025/0024105 A1 Jan. 16, 2025

Related U.S. Application Data

(63) Continuation of application No. 16/627,981, filed as application No. PCT/US2019/032525 on May 15, 2019, now Pat. No. 12,120,396.

(51) Int. Cl.
*H04N 21/475* (2011.01)
*G06N 20/00* (2019.01)
(Continued)

(52) U.S. Cl.
CPC ......... *H04N 21/4756* (2013.01); *G06N 20/00* (2019.01); *H04N 21/2393* (2013.01); *H04N 21/25891* (2013.01); *H04N 21/4667* (2013.01)

(58) Field of Classification Search
CPC ........... H04N 21/4756; H04N 21/2393; H04N 21/25891; H04N 21/4667; H04N 21/2187;
(Continued)

(56) References Cited

U.S. PATENT DOCUMENTS

| | | | | |
|---|---|---|---|---|
| 6,553,178 B2 * | 4/2003 | Abecassis | .............. | H04H 60/66 348/E7.071 |
| 7,827,259 B2 * | 11/2010 | Heller | .................. | G11B 27/034 709/231 |

(Continued)

FOREIGN PATENT DOCUMENTS

| | | |
|---|---|---|
| CA | 2335201 C | 4/2007 |
| CA | 2666795 C | 11/2018 |

(Continued)

OTHER PUBLICATIONS

Anonymous, "About ad filters—AdMob Help," Sep. 26, 2015, 2 Pages, XP055449616, [Retrieved Date: 20180208] Retrieved from URL: https://web.archive.org/web/20150926052821/https://support.google.com/admob/answer/3150235?hl=en.

(Continued)

*Primary Examiner* — Nathan J Flynn
*Assistant Examiner* — Christine A Kurien
(74) *Attorney, Agent, or Firm* — Lowenstein Sandler LLP

(57) ABSTRACT

Methods and systems for providing requested media items with supplemental media items are described herein. A request of a first user for a first media item of a second user is received. The first media item is associated with a set of rules on how to select additional media items corresponding to the first media item. The set of rules is provided by the second user and includes conditions pertaining to users requesting access to the first media item. A determination is made of whether one or more conditions defined by the set of rules and pertaining to the first user are satisfied with respect to a second media item of the additional media items. Responsive to a determination that the one or more conditions are satisfied, the second media item is provided for presentation via a first user device associated with the first user.

20 Claims, 8 Drawing Sheets

(51) Int. Cl.
*H04N 21/239* (2011.01)
*H04N 21/258* (2011.01)
*H04N 21/466* (2011.01)

(58) Field of Classification Search
CPC ......... H04N 21/23424; H04N 21/2743; H04N 21/4788; H04N 21/812; H04N 21/2668; H04N 21/233; H04N 21/26241; H04N 21/47217; G06N 20/00
See application file for complete search history.

(56) References Cited

U.S. PATENT DOCUMENTS

| | | | | |
|---|---|---|---|---|
| 9,363,546 | B2 * | 6/2016 | Burger | H04N 21/4223 |
| 9,537,811 | B2 | 1/2017 | Allen et al. | |
| 10,698,909 | B2 | 6/2020 | Alvino et al. | |
| 10,833,399 | B1 * | 11/2020 | Howarth | H01Q 9/36 |
| 11,323,398 | B1 * | 5/2022 | Lonkar | H04L 51/046 |
| 2005/0240661 | A1 | 10/2005 | Heller et al. | |
| 2008/0229353 | A1 * | 9/2008 | Morris | H04N 21/812 348/E7.071 |
| 2011/0313916 | A1 * | 12/2011 | Niven-Jenkins | H04N 21/2668 709/219 |
| 2012/0072936 | A1 | 3/2012 | Small et al. | |
| 2013/0031216 | A1 * | 1/2013 | Willis | G06Q 10/40 709/219 |
| 2013/0212495 | A1 | 8/2013 | Zuckerberg et al. | |
| 2014/0129300 | A1 * | 5/2014 | Ensor | G06Q 30/0239 705/14.39 |
| 2016/0212455 | A1 | 7/2016 | Manna | |
| 2017/0099367 | A1 * | 4/2017 | Lewis | H04L 51/52 |
| 2017/0201779 | A1 * | 7/2017 | Publicover | G06Q 30/0269 |
| 2018/0225725 | A1 * | 8/2018 | Paul | G06Q 30/0277 |
| 2018/0288481 | A1 | 10/2018 | Goyal et al. | |
| 2019/0037282 | A1 * | 1/2019 | Vaculin | H04N 21/812 |
| 2019/0075339 | A1 | 3/2019 | Smith | |
| 2019/0356944 | A1 * | 11/2019 | Patel | H04N 21/2668 |
| 2020/0099755 | A1 * | 3/2020 | Rose | H04N 21/4788 |
| 2020/0382821 | A1 * | 12/2020 | Kawakami | H04N 21/2187 |
| 2021/0191578 | A1 * | 6/2021 | Miura | G06F 3/04886 |

FOREIGN PATENT DOCUMENTS

| | | | |
|---|---|---|---|
| CN | 105474672 | A | 4/2016 |
| CN | 107851270 | A | 3/2018 |
| CN | 108259409 | A | 7/2018 |
| JP | 2004185456 | A | 7/2004 |
| JP | 2004253933 | A | 9/2004 |
| JP | 2009532956 | A | 9/2009 |
| JP | 2010522460 | A | 7/2010 |
| JP | 2013176109 | A | 9/2013 |
| JP | 2018502345 | A | 1/2018 |
| JP | 2019016398 | A | 1/2019 |
| WO | 2009140882 | A1 | 11/2009 |

OTHER PUBLICATIONS

International Preliminary Report on Patentability for International Application No. PCT/US2019/032525, mailed Oct. 25, 2021, 10 Pages.

International Search Report and Written Opinion for International Application No. PCT/US2019/032525, mailed Sep. 30, 2019, 12 Pages.

International Search Report and Written Opinion for International Application No. PCT/US2019/057286, mailed Mar. 25, 2020, 9 pages.

Office Action for Indian Patent Application No. 202348055178, mailed Feb. 26, 2026, 8 Pages.

* cited by examiner

DYNAMIC INTEGRATION OF CUSTOMIZED SUPPLEMENTAL MEDIA CONTENT

RELATED APPLICATIONS

This application is a Continuation of U.S. application Ser. No. 16/627,981, filed Dec. 31, 2019, which is US National Stage 371 Application of PCT Application No. PCT/US2019/032525, filed May 15, 2019, all of which are hereby incorporated by reference as is set forth in full in this application for all purposes.

TECHNICAL FIELD

Aspects of the present disclosure generally relate to selecting customized supplemental media items for integration with requested media items.

BACKGROUND

A viewer may request a video of a video owner for presentation on a user device of the viewer. The video may include one version of supplemental content for presentation to all viewers requesting the video. For example, the video owner may include a message within the video prompting a viewer to perform an action, regardless of whether the viewer is likely to complete the prompted action.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

According to some aspects of the present disclosure, a computer-implemented method is provided that includes receiving, at a server, a request of a first user for a first media item of a second user, the first media item including at least one of video content or audio content; determining that the first media item of the second user corresponds to a plurality of second media items of the second user, each of the plurality of second media items including at least one of video content or audio content; identifying a set of rules on how to select a second media item, from the plurality of second media items, to be integrated with the first media item of the second user, the set of rules being provided by the second user and including one or more conditions pertaining to the first user; selecting, from the plurality of second media items, the second media item based on the set of rules; and transmitting the first media item and the selected second media item to a first user device of the first user, where the selected second media item is to be integrated with the first media item for presentation to the first user.

In general, at least one of the plurality of second media items may prompt the first user to perform an action. The action may be of any suitable type and may be a part of a technical task. Therefore, by transmitting the first media item and the selected second media item to the first user device of the first user, with the selected second media item to be integrated with the first media item for presentation to the first user, the method allows a human-machine interaction interface to be seamlessly incorporated within the requested first media item.

By further selecting the second media item from the plurality of second media items based upon the set of rules comprising one or more conditions pertaining to the first user, the selected second media item may be tailored for the first user, thereby allowing the human-machine interaction interface represented by the selected second media item to be of particular relevance to the first user. In this way, the method of the present disclosure may efficiently assist the first user in performing an action relevant to the first user, by means of a continued and guided human-machine interaction process.

The at least one of the plurality of second media items may for example include a message (e.g., which may comprise visual and/or audio element(s)) suggesting the action to the first user, and/or an action element (e.g., a hyperlink) which is selectable by the first user to induce execution of the action. Optionally, the action may be associated with the respective second media item, or alternatively may pertain to the second user but may not be associated with the respective second media item.

Each of the plurality of second media items may comprise distinct video or audio content.

The set of rules on how to select a second media item to be integrated with the first media item of the second user may further comprise a rule to select the second media item based on a set of rankings provided by the second user, where each of the plurality of second media items may be associated with a ranking of the set of rankings.

Selecting the second media item based on the set of rules may comprise: identifying, from the plurality of second media items, the second media item that is associated with a highest ranking; and determining that the one or more conditions pertaining to the first user are satisfied with respect to the second media item.

Alternatively or in addition, selecting the second media item based on the set of rules may comprise: identifying, from the plurality of second media items, a third media item that is associated with a highest ranking; determining that the one or more conditions pertaining to the first user are not satisfied with respect to the third media item; identifying, from the plurality of second media items, the second media item that is associated with a lower ranking than the third media item associated with the highest ranking; and determining that the one or more conditions pertaining to the first user are satisfied with respect to the second media item.

The first user device may be to render the first media item and the selected second media item as a combined media item. The selected second media item may be to be integrated with the first media item. A transition between the first media item and the second media item may be not visible to the first user.

The method may further comprise: determining a time-based index of a timeline of the first media item, wherein the time-based index indicates a location on the timeline of the first media item where the content of the selected second media item is to be presented to the first user; and transmitting the time-based index with the first media item and the selected second media item to the first user device of the first user, wherein the selected second media item is to be integrated into the first media item at the location corresponding with the time-based index on the timeline of the first media item.

The time-based index of the timeline of the first media item may be created based on interaction of the second user with the timeline of the first media item.

Alternatively or in addition, the time-based index of the timeline of the first media item may be determined using a trained machine learning model.

The first media item may comprise a live media stream. Transmitting the first media item and the selected second media item to the first user device of the first user may comprise: transmitting the live media stream to the first user device of the first user; receiving, from a second user device of the second user, an indication to integrate the selected second media item with the live media stream; and responsive to receiving the indication to integrate the selected second media item with the live media stream, transmitting the selected second media item to the first user device of the first user, wherein the selected second media item is to be integrated with the live media stream.

One or more characteristics pertaining to the first user may change based on an action performed by the first user. For example, if the first user performs an action prompted by a message of the selected second media item, a characteristic associated with the first user may change to reflect that the first user has previously performed the action. As a result, a third media item from the plurality of second media items may be selected, based on the set of rules, in response to a second request by the first user for the first media item, or a request for a second media item of the second user. The third media item may be selected based on the application of the set of rules and the change to one or more characteristics pertaining to the first user. In this way, the method of the present disclosure may dynamically respond to a request for a first media item associated with the second user by efficiently selecting a second media item that is relevant to the first user and integrating the selected second media item with the first media item.

According to some aspects of the present disclosure, a computer-implemented method is provided that includes receiving, at a server, a request of a first user for a first media item of a second user, the first media item including at least one of video content or audio content; determining that the first media item of the second user corresponds to a plurality of second media items of the second user, each of the plurality of second media items including at least one of video content or audio content; identifying a set of rules on how to select a second media item, from the plurality of second media items, to be integrated with the first media item of the second user, the set of rules being provided by the second user and comprising one or more conditions pertaining to the first user and a rule to select the second media item based on a set of rankings provided by the second user, where each of the plurality of second media items is associated with a ranking of the set of rankings; selecting, from the plurality of second media items, the second media item based on the set of rules; determining a time-based index of a timeline of the first media item, where the time-based index indicates a location on the timeline of the first media item where the content of the selected second media item is to be presented to the first user; and transmitting the first media item, the selected second media item, and the time-based index to a first user device of the first user, where the selected second media item is to be integrated with the first media item at the location corresponding with the time-based index on the timeline of the first media item.

Transmitting the first media item, the selected second media item, and the time-based index to the first user device allows the selected second media item to be readily incorporated with the first media item at a location of the first media item defined by the time-based index. As such, content integration may occur at the first user device almost immediately (i.e., within a minimal delay caused by network conditions) after a user request for the first media item is submitted.

Each of the plurality of second media items may include distinct video or audio content. The first user device may render the first media item and the selected second media item as a combined media item, where the selected second media item is to be integrated with the first media item, and wherein a transition between the first media item and the selected second media item is not visible to the first user.

Optionally, selecting the second media item based on the set of rules may include identifying, from the plurality of second media items, the second media item that is associated with a highest ranking; and determining that the one or more conditions pertaining to the first user are satisfied with respect to the second media item. Selecting the second media item based on the set of rules may also include identifying, from the plurality of second media items, a third media item that is associated with a highest ranking; determining that the one or more conditions pertaining to the first user are not satisfied with respect to the third media item; identifying, from the plurality of second media items, the second media item that is associated with a lower ranking than the third media item associated with the highest ranking; and determining that the one or more conditions pertaining to the first user are satisfied with respect to the second media item.

Optionally, the first media item may include a live media stream. Transmitting the first media item and the selected second media item to the first user device of the first user may include transmitting the live media stream to the first user device of the first user; receiving, from a second user device of the second user, an indication to integrate the selected second media item with the live media stream; and responsive to receiving the indication to integrate the selected second media item with the live media stream, transmitting the selected second media item to the first user device of the first user, wherein the selected second media item is to be integrated with the live media stream.

According to other aspects of the present disclosure, a system is provided that includes a memory and a processing device coupled to memory. The processing device is configured to perform: receiving, at a server, a request of a first user for a first media item of a second user, the first media item including at least one of video content or audio content; determining that the first media item of the second user corresponds to a plurality of second media items of the second user, each of the plurality of second media items including at least one of video content or audio content; identifying a set of rules on how to select a second media item, from the plurality of second media items, to be integrated with the first media item of the second user, the set of rules being provided by the second user and including one or more conditions pertaining to the first user; selecting, from the plurality of second media items, the second media item based on the set of rules; and transmitting the first media item and the selected second media item to a first user device of the first user, where the selected second media item is to be integrated with the first media item for presentation to the first user.

Each of the plurality of second media items may comprise distinct video or audio content.

The set of rules on how to select a second media item to be integrated with the first media item of the second user may further comprise a rule to select the second media item based on a set of rankings provided by the second user, where each of the plurality of second media items may be associated with a ranking of the set of rankings.

Selecting the second media item based on the set of rules may comprise: identifying, from the plurality of second media items, the second media item that is associated with a highest ranking; and determining whether the one or more conditions pertaining to the first user are satisfied with respect to the second media item.

Alternatively or in addition, selecting the second media item based on the set of rules may comprise: identifying, from the plurality of second media items, a third media item that is associated with a highest ranking; determining that the one or more conditions pertaining to the first user are not satisfied with respect to the third media item; identifying, from the plurality of second media items, the second media item that is associated with a lower ranking than the third media item associated with the highest ranking; and determining that the one or more conditions pertaining to the first user are satisfied with respect to the second media item.

According to other aspects of the present disclosure, a system is provided that includes a memory and a processing device coupled to memory. The processing device is configured to perform: receiving, at a server, a request of a first user for a first media item of a second user, the first media item including at least one of video content or audio content; determining that the first media item of the second user corresponds to a plurality of second media items of the second user, each of the plurality of second media items including at least one of video content or audio content; identifying a set of rules on how to select a second media item, from the plurality of second media items, to be integrated with the first media item of the second user, the set of rules being provided by the second user and comprising one or more conditions pertaining to the first user and a rule to select the second media item based on a set of rankings provided by the second user, where each of the plurality of second media items is associated with a ranking of the set of rankings; selecting, from the plurality of second media items, the second media item based on the set of rules; determining a time-based index of a timeline of the first media item, where the time-based index indicates a location on the timeline of the first media item where the content of the selected second media item is to be presented to the first user; and transmitting the first media item, the selected second media item, and the time-based index to a first user device of the first user, where the selected second media item is to be integrated with the first media item at the location corresponding with the time-based index on the timeline of the first media item. Each of the plurality of second media items may include distinct video or audio content. The first user device may render the first media item and the selected second media item as a combined media item, where the selected second media item is to be integrated with the first media item, and wherein a transition between the first media item and the selected second media item is not visible to the first user.

According to some aspects of the present disclosure, a non-transitory computer readable storage medium is provided that includes instructions which, when executed by a processing device, cause the processing device to perform operations comprising: receiving a request of a first user for a first media item of a second user, the first media item including at least one of video content or audio content; determining that the first media item of the second user corresponds to a plurality of second media items of the second user, each of the plurality of second media items including at least one of video content or audio content; identifying a set of rules on how to select a second media item, from the plurality of second media items, to be integrated with the first media item of the second user, the set of rules being provided by the second user and comprising one or more conditions pertaining to the first user; selecting, from the plurality of second media items, the second media item based on the set of rules; and transmitting the first media item and the selected second media item to a first user device of the first user, wherein the selected second media item is to be integrated with the first media item for presentation to the first user.

Each of the plurality of second media items may comprise distinct video or audio content.

The set of rules on how to select a second media item to be integrated with the first media item of the second user may further comprise a rule to select the second media item based on a set of rankings provided by the second user, where each of the plurality of second media items may be associated with a ranking of the set of rankings.

Selecting the second media item based on the set of rules may comprise: identifying, from the plurality of second media items, the second media item that is associated with a highest ranking; and determining that the one or more conditions pertaining to the first user are satisfied with respect to the second media item.

Alternatively or in addition, selecting the second media item based on the set of rules may comprise: identifying, from the plurality of second media items, a third media item that is associated with a highest ranking; determining that the one or more conditions pertaining to the first user are not satisfied with respect to the third media item; identifying, from the plurality of second media items, the second media item that is associated with a lower ranking than the third media item associated with the highest ranking; and determining that the one or more conditions pertaining to the first user are satisfied with respect to the second media item.

According to some aspects of the present disclosure, a non-transitory computer readable storage medium is provided that includes instructions which, when executed by a processing device, cause the processing device to perform the methods described above.

The individual features and/or combinations of features defined above in accordance with any aspect of the present disclosure or below in relation to any specific implementations may be utilized, either separately and individually, alone or in combination with any other defined feature, in any other aspect or implementation. Further, the present disclosure is intended to cover apparatus configured to perform any feature described herein in relation to a method and/or a method of using or producing, using or manufacturing any apparatus feature described herein.

BRIEF DESCRIPTION OF DRAWINGS

The present disclosure is illustrated by way of example, and not by way of limitation, in the figures of the accompanying drawings in which like references indicate similar elements. It should be noted that different references to "an" or "one" implementation in this disclosure are not necessarily to have the same implementation, and such references mean at least one.

DETAILED DESCRIPTION

Figure 1:
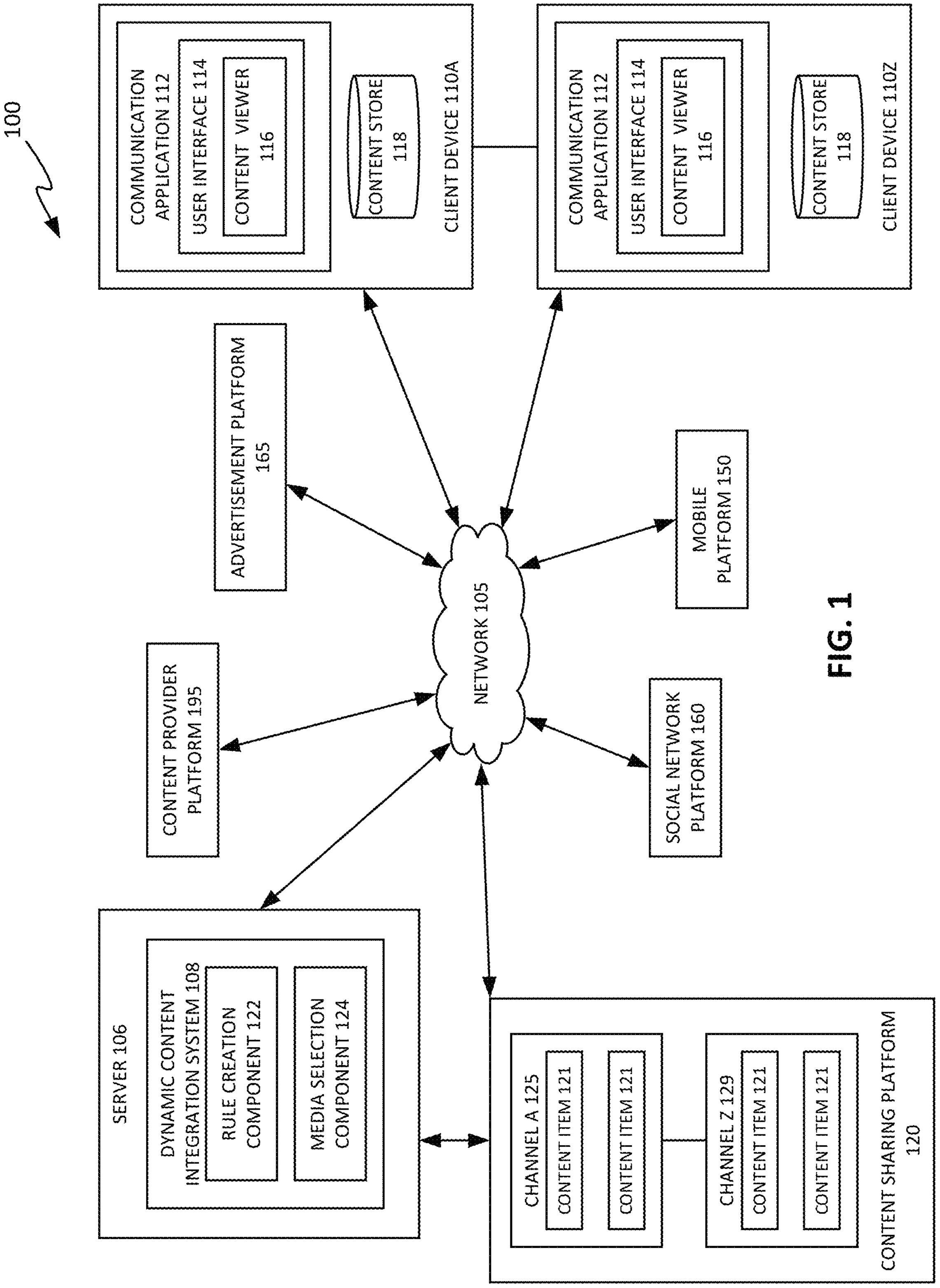
FIG. 1 illustrates an example of system architecture for providing requested media items with integrated supplemental media items customized for requesting users, in accordance with some aspects of the present disclosure.

Aspects of the present disclosure are directed to providing requested media content of a content owner with integrated supplemental content customized for a requesting viewer. A content sharing platform allows content owners to upload media content (e.g., video items or audio items) for presentation to various users of the content sharing platform. A content owner may want to include supplemental content into his or her media content. For example, a content owner may want to prompt an action from his or her viewers in order to achieve an objective, such as causing the viewer to perform a task relating to the media content. Conventional content sharing platforms allow a content owner to include one or more messages within the media item. However, each user that consumes the media item is typically presented with the same message containing the prompted action, regardless of whether the user is likely to complete the prompted action (e.g., if the user has already completed the prompted action in the past) or whether the prompted action is applicable to the user. If a user has already completed the prompted action (or the prompted action is not applicable to the user), but is continuously presented with that same message, the user may no longer be interested in watching and/or listening to the content owner's media items and the content owner's objectives may not be realized.

In another example, a media item may contain content that is sensitive to certain groups of viewers. That is, particular users may not be granted access to view and/or listen to the media item containing such sensitive content. Conventional content sharing systems typically do not provide an option for the content owner to supply an alternative version of content in order to replace a sensitive portion of content with distinct audio or video content, thus allowing the user to watch and/or listen to the media item without being exposed to the sensitive portion of content.

Implementations of the present disclosure address the above and other deficiencies by providing dynamic integration, into primary media content of a content owner, of supplemental content that is customized for a user who has requested the primary media content. "Dynamic integration" as used herein refers to content integration that occurs almost immediately (i.e., within a minimal delay caused by network conditions) after a user request for the primary media item is submitted, where depending on the user who requested the content and the timing of the request, different supplemental content is dynamically integrated into the primary media content. In particular, a dynamic content integration system of the present disclosure may allow a content owner to upload a first media item to a content sharing platform and also upload additional media items ("second media items") that can be (upon receiving an end user request for the first media item) used as supplemental content for the first media item. The dynamic content integration system may also allow the content owner to specify rules that define how to select one or more second media items for a particular user requesting the first media item. Subsequently, the dynamic content integration system may receive a request from a first user for a first media item (a video item or an audio item), and respond to the request by selecting, from second media items associated with the first media item, a particular second media item that should be integrated with the first media item for presentation to the first user, where the second media item is selected specifically for the first user. Each of the second media items may include distinct video and/or audio content. The second media item may be selected based on a set of rules provided by the second user. The set of rules may include one or more conditions pertaining to the first user and specify how to select the second media item from the supplied second media items (e.g., based on the conditions and, in some implementations, also based on a set of rankings provided by the second user). Responsive to the selection of the second media item, the first media item and the selected second media item may be transmitted to a user device of the first user. The user device may render the first media item and the second media item as a combined media item, where the second media item is integrated with the first media item for presentation to the first user.

Thus, the technical effect may include providing a first user with a combined media item where the combined media item includes primary media content and dynamically integrated additional content that is specifically selected for the first user from media content items supplied by the content owner to supplement the primary media content. This prevents the first user from being presented with a portion of content within the combined media item that is irrelevant to, or not allowed to be consumed by, the first user. For example, the primary media content (e.g., the first media item) may relate to the repair process of a family of apparatuses comprising various different models, and the dynamically integrated additional content (e.g., the second media item) may prompt the first user to perform a particular maintenance action depending upon the model of the apparatus owned by the first user. That is, if a third user has a different model, the third user, while consuming the primary media item, may be presented with an additional content that is different from the additional content presented to the first user and that is suitable for the model owned by the third user. By providing users with distinct additional content based upon one or more characteristics of the users, a more efficient human-machine interface which is seamlessly incorporated within the primary media content and is customized to the user may be provided. In another example, if a first user is not a subscriber to a media channel of a second user, the first user, while consuming a first media item of the second user, may be presented with a message prompting the first user to subscribe to the media channel. If a third user is a subscriber to the media channel, the third user, while consuming the first media item, may be presented with a message that is different from the message prompting the second user to subscribe to the video channel (e.g., a message prompting the third user to contribute to a fan funding campaign, purchase merchandise or live event tickets, etc.). By providing users with distinct messages based on one or more characteristics, system resources are no longer wasted on presenting messages that are irrelevant to a user, the users' trust/interest in the content sharing platform is improved, and content owners are now able to promote a desired objective without continuously presenting messages that are likely to be ignored by many users.

FIG. 1 illustrates an example of system architecture 100 for providing requested media items with integrated supplemental media items customized for requesting users, in accordance with implementations of the present disclosure. The system architecture 100 includes client devices 110A-110Z (also referred to herein as user devices or endpoint devices), one or more networks 105, one or more servers 106, one or more electronic devices 170, and one or more platforms (e.g., content sharing platform 120, advertisement platform 165, mobile platform 150, social network platform 160, content provider platform 195, etc.). The platforms can include one or more computing devices (such as a rackmount server, a router computer, a server computer, a personal computer, a mainframe computer, a laptop computer, a tablet computer, a desktop computer, etc.) and one or more data stores (e.g., hard disks, memories, and databases) and may be coupled to one or more networks 105.

The one or more networks 105 can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof. In one implementation, some components of architecture 100 are not directly connected to each other. In one implementation, architecture 100 includes separate networks 105.

The one or more data stores (not shown) can reside in memory (e.g., random access memory), cache, devices (e.g., hard drive), flash drives, etc., and can be part of one or more database systems, one or more file systems or another type of component or device capable of storing data. The one or more data stores can include multiple storage components (e.g., multiple drives or multiple databases) that may also span multiple computing devices (e.g., multiple server computers). The data store can be persistent storage that is capable of storing data. A persistent storage can be a local storage unit or a remote storage unit, electronic storage units (main memory), or similar storage unit. Persistent storage can be a monolithic device or a distributed set of devices. A 'set,' as used herein, refers to any positive whole number of items.

Content items 121 (e.g., media items) may be stored on one or more data stores. The data stores can be part of one or more platforms. Examples of a content item 121 can include, and are not limited to, digital video, digital movies, animated images, digital photos, digital music, digital audio, digital video games, collaborative media content presentations, website content, social media updates, electronic books (ebooks), electronic magazines, digital newspapers, digital audio books, electronic journals, web blogs, real simple syndication (RSS) feeds, electronic comic books, software applications, etc. Content items 121 may be pre-recorded or live-streaming. For brevity and simplicity, a media item may be used as an example of a content item 121 throughout this document. The content items 121 can be provided by content providers. A content provider can be a user, a company, an organization, etc. and can provide content items 121 via the content provider platform 195 or any of the client devices 110A-110Z. A content provider can provide content items 121 that are media items. For example, a content item 121 may be a video item provided by a content owner. In another example, a content item 121 may be an audio item provided by a content owner. The client devices 110A-110Z can include devices, such as, televisions, smart phones, cellular telephones, personal digital assistants (PDAs), portable media players, netbooks, laptop computers, electronic book readers, tablet computers, desktop computers, set-top boxes, gaming consoles, and the like. The individual client devices 110A-110Z can include a communication application 112. A content item 121 can be consumed via the communication application 112. As used herein, "media," "media item," "online media item," "digital media," "digital media item," "content," "media content item," and "content item" can include an electronic file that can be executed or loaded using software, firmware, or hardware configured to present a content item 121. In one implementation, the communication application 112 may be one or more applications that allow users to compose, send, and receive content items 121 (e.g., video and/or audio items) over a platform (e.g., content sharing platform 120, recommendation platform 157, advertisement platform 165, mobile platform 150, social network platform 160, search platform 145, collaboration platform 155, and content provider platform 195) and/or a combination of platforms and/or networks.

For example, the communication application 112 may be a social networking application, a video sharing application, a video streaming application, a video game streaming application, a video on demand application, a photo sharing application, a chat application, a mobile application of a content provider, or a combination of such applications. The communication application in a client device 110A-110Z can render, display, and/or present one or more content items 121 (e.g., video and/or audio items) to one or more users. For example, the communication application 112 can provide one or more user interfaces 114 (e.g., graphical user interfaces) to be displayed on a client device 110A-110Z for providing, receiving, and/or playing video content. In some implementations, the communication application 112 may render a first content item (e.g., a first media item) with a second content item (e.g., a second media item) as a combined content item.

In one implementation, the communication application 112 may include a user interface 114. The user interface may be used to search for content items 121 and may play content items 121 in a content viewer 116 portion of the user interface 114. The content viewer 116 may render, display, and/or present content items 121 (e.g., media items) to one or more users. In one implementation, the content viewer 116 is embedded in an application (e.g., communication application 112). In another implementation, the content viewer 116 may be a standalone application (e.g., mobile application, desktop application, gaming console application, television application, etc.), such as communication application 112, that allows users to consume (e.g., play, display) content items 121, such as videos, images, documents (e.g., web pages), etc. For example, the content viewer 116 may be a web browser that can access, retrieve, present, and/or navigate content (e.g., web pages such as Hyper Text Markup Language (HTML) pages, digital media items, etc.) served by a web server of a platform. In another example, the content viewer 116 may display an embedded media player (e.g., a Flash® player or an HTML5 player) that is embedded in a document (e.g., user interface 114 (a web page)).

The content viewer 116 can be provided to the client devices 110A-110Z by a server 106 and/or a platform. For example, the content viewer 116 may be an embedded media player that is embedded in a user interface 114 (e.g., documents (web pages) or screens of a stand-alone application) provided by the content sharing platform 120 or the content provider platform 195. In another example, the content viewer 116 may be an application that is downloaded from a platform (e.g., content sharing platform 120, recommendation platform 157, advertisement platform 165, mobile platform 150, social network platform 160, search platform 145, collaboration platform 155, and content provider platform 195). In another example, the content viewer 116 may be a standalone application that is pre-installed on the client device 110A-110Z.

The client devices 110A-110Z may further include a content store 118. The content store 118 may be a storage system on a client device 110A-110Z where one or more media item files transmitted to and received from server 106 and/or content sharing platform 120 are stored.

One or more servers 106 may include computing devices such as a rackmount server, a router computer, a server computer, a personal computer, a mainframe computer, a laptop computer, a tablet computer, a desktop computer, etc. and may be coupled to one or more networks 105. The one or more servers 106 may be independent devices or part of any of the platforms (e.g., content sharing platform 120, recommendation platform 157, advertisement platform 165, mobile platform 150, social network platform 160, search platform 145, content provider platform 195, and collaboration platform 155). The server(s) 106 may host a dynamic content integration system 108 that can include a rule creation component 122 and a media selection component 124. The rule creation component 122 may provide a user interface that allows a content owner who uploads a first media item to the content sharing platform 120 to specify additional media items (i.e., second media items) that can be used as supplemental content for the first media item. The user interface may also allow the content owner to specify rules that define how to select one or more second media items for a particular user requesting the first media item. The rule creation component 122 stores information identifying an association between the first media item and the second media items in a data store, together with the rules provided by the content owner.

Media selection component 124 may identify a first media item to be presented to a user on client device 110A-110Z, responsive to a user request. A user of a client device 110A-110Z may transmit a request for a first media item, which is received by media selection component 124. Media selection component 124 may identify information relating to the requested first media item, including the location of the first media item. In some implementations, the identified information may also include an indication (e.g., in the metadata of the first media item) that the first media item should be presented with supplemental content. The rule creation component 122 may analyze the information relating to the first media item and determine that the first media item is associated with multiple second media items that can be used as supplemental content for the first media item.

Responsive to determining that the first media item should be presented with supplemental content, media selection component 124 may identify the second media items associated with the first media item (e.g., from the data store that stores the association between the first media item and the second media items that can be used as supplemental content for the first media item). Media selection component 124 may further identify a set of rules for selecting, from the second media items, a particular second media item that is relevant to the user who has requested the first media item. Media selection component 124 may select a second media item from the second media items based on the identified set of rules, in accordance with implementations described herein. Upon selecting the second media item, the requested first media item and the selected second media item may be transmitted to client device 110A-110Z.

The content provider platform 195 can provide a service of a service provider. For example, a content provider may be a video streaming service provider that produces a media streaming service via a communication application 112 for users to play videos, TV shows, video clips, audio, audio clips, and movies, on client devices 110A-110Z via the content provider platform 195.

The social network platform 160 can provide an online social networking service. The social networking platform 160 can provide a communication application 112 for users to create profiles and perform activity with their profile. Activity can include updating a profile, exchanging messages with other users, evaluating (e.g., like, comment, share, recommend) status updates, photos, videos, etc., and receiving notifications of other users activity.

The mobile platform 150 can be used to allow users to connect to, share information, and/or interact with each other using one or more mobile devices (e.g., phones, tablet computers, laptop computers, wearable computing devices, etc.) and/or any other suitable device. For example, the mobile platform 150 may enable telephone communication, Short Message Service (SMS) messaging, Multimedia Message Service (MMS) messaging, text chat, and/or any other communication between users. The mobile platform 150 can support user communications via video messaging, video chat, and/or videoconferences.

The content sharing platform 120 can be used to provide one or more users with access to content items 121 and/or provide the content items 121 to one or more users. For example, the content sharing platform 120 may allow users to consume, upload, download, and/or search for content items 121. In another example, the content sharing platform 120 may allow users to evaluate content items 121, such as, approve of ("like"), disapprove of ("dislike"), recommend, share, rate, and/or comment on content items 121. In another example, the content sharing platform 120 may allow users to edit content items 121. The content sharing platform can also include a website (e.g., one or more webpages) and/or one or more applications (e.g., communication applications 112) that may be used to provide one or more users with access to the content items 121, for example, via client devices 110A-110Z. Content sharing platform 120 can include any type of content delivery network providing access to content items 121.

The content sharing platform 120 can include multiple channels (e.g., Channel A 125 through Channel Z 129). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, Channel A 125 may include videos Y and Z. A channel can be associated with an owner, who is a user that can perform actions on the channel. The data content can be one or more content items 121. The data content in the channels can be pre-recorded or live-streaming. Although channels are described as one implementation of a content sharing platform 120, implementations of the disclosure are not limited to content sharing platforms that provide content items 121 via a channel model.

Figure 2:
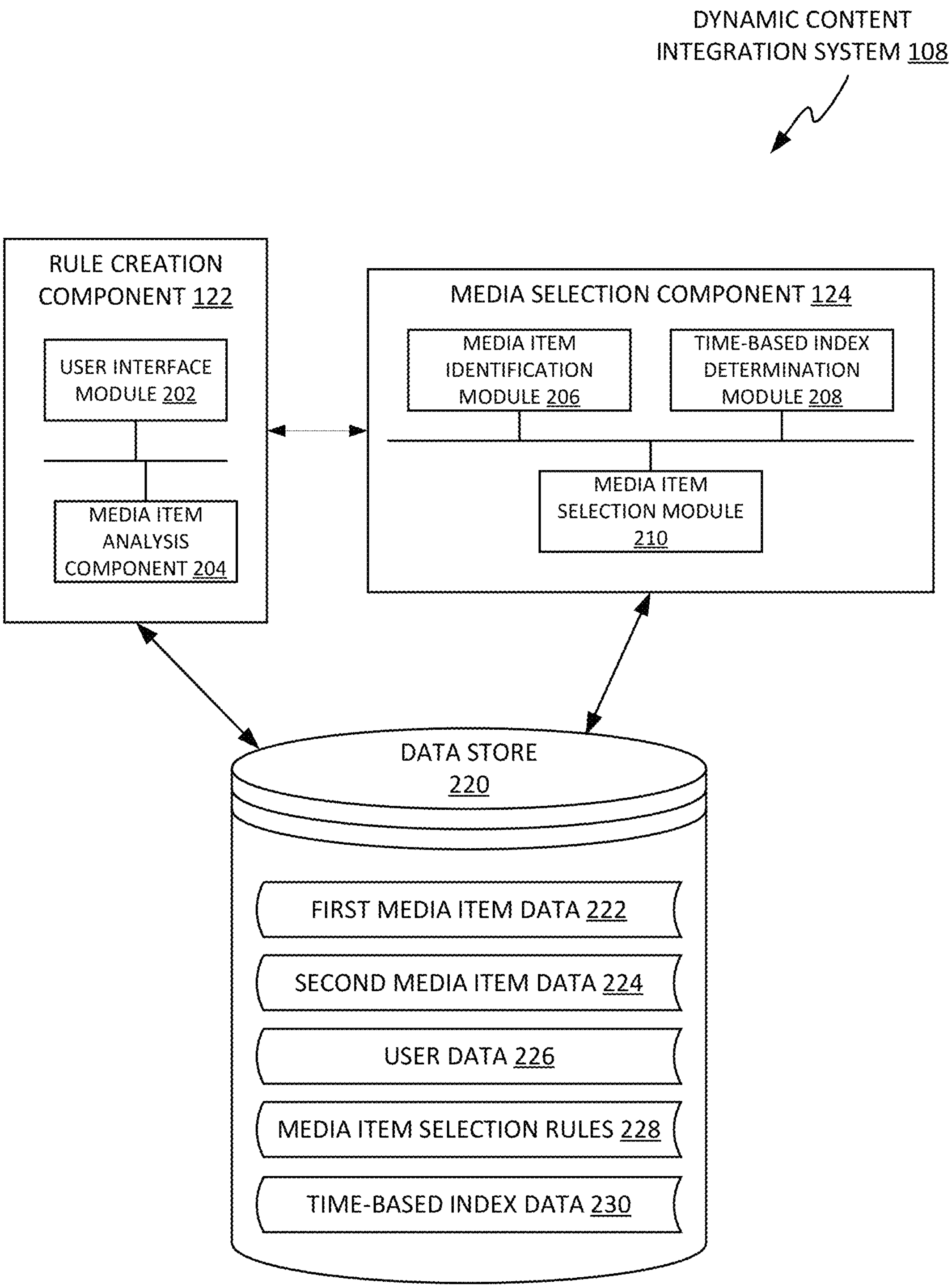
FIG. 2 is a block diagram illustrating a dynamic content integration system, in accordance with some aspects of the present disclosure.

FIG. 2 is a block diagram illustrating a dynamic content integration system 108 hosted by server 106, in accordance with some implementations of the present disclosure. The dynamic content integration system 108 includes a rule creation component 122 and a media selection component 124. The dynamic content integration system 108 may include more or less components or modules without loss of generality. For example, two or more of the components may be combined into a single component, or features of a component or module may be divided into two or more components. In one implementation, one or more of the components may reside on different computing devices (e.g., a server device and a client device).

In general, functions described in one implementation as being performed by server 106 may be performed by multiple different servers 106 in other implementations. For example, the server 106 may execute a program that performs one or more functions of the rule creation component 122 and a different device may perform one or more of the functions of media selection component 124. The functionality attributed to a particular component can be performed by different or multiple components operating together.

The rule creation component 122 may include a user interface module 202 that generates a rule creation interface and provides it for presentation to a content owner. The rule creation user interface can allow the content owner who has uploaded a first media item (identified in first media item data 222 of data store 220) to specify second media items (identified in second media item data 224 of data store 220) that can be used as supplemental content for the first media item. The rule creation user interface may also allow the content owner to specify rules that define how to select one or more second media items for a particular user requesting the first media item. The rule creation component 122 stores information identifying an association between the first media item and the second media items, together with the rules provided by the content owner as media item selection rules 228.

The rule creation user interface may further allow the content owner to specify a time-based index associated with the first media item. The time-based index may indicate a location on a timeline of the first media item where the supplemental content is to be integrated with the first media item. In some implementations, the content owner may specify a time-based index by interacting with a timeline of the first media item via the rule creation user interface. The rule creation component 122 stores information identifying the time-based index as time-based index data 230. An example rule creation user interface is described in more detail below in conjunction with FIG. 6.

The rule creation component 122 may further include a media item analysis module 204 that analyzes information related to a first media item subject to a user request, to determine that the first media item is associated with multiple second media items.

Media selection component 124 may include a media item identification module 206 that identifies a first media item to be presented to a user on a client device, responsive to a user request. The first media item may be provided by the content owner and may be stored or identified in data store 220 as first media item data 222. First media item data 222 may include first media item details and optionally first media item content. The first media item details may include information about the first media item, such as a title, description, comments, storage location, file name, author, source, file size, duration, format, resolution, video image dimensions, edit or creation time, other details, or a combination thereof. The first media item details may further include an indication that second media items are associated with the first media item (e.g., an entry for the first media item in data store 220 may include one or more identifiers representing the second media items). The second media items may also be provided by the content owner. The second media items can be stored or identified in data store 220 as second media item data 224, which includes second media item details and optionally second media item content. The second media item details may include information about the second media item, such as an objective associated with the second media item, a ranking associated with the second media item, a description, comments, storage location, file name, author, source, file size, duration, format, resolution, video image dimensions, edit or creation time, other details, or a combination thereof. Responsive to receiving a user request for the first media item and identifying the first media item from the data store 220, media item analysis module 204 of the rule creation component 122 may analyze the first media item details of first media item data 222 to determine that the first media item is associated with multiple second media items.

Media selection component 124 may include a media item selection module 210. The media item selection module 210 may select one or more second media items for the user requesting the first media item based on user data 226 and media item selection rules 228. User data 226 may include data about one or more users of a content sharing platform (e.g., content sharing platform 120 of FIG. 1). User data 226 may include one or more measurements for a specific user or for a group of multiple users. In one example, user data 226 may include characteristics of a group of users, consumption data, other data, or a combination thereof. The characteristics of the group of users may provide details about the group of users and may include, for example, users' location, language, and/or other similar information. Consumption data may be specific to a user or specific to the requested first media item and may include a duration of consumptions, quantity of users, drop off rates, portions re-watched and/or re-listened to, portions paused or zoomed in on, other measurement, or a combination thereof.

Media selection component 124 may also include a time-based index determination module 208 which determines a time-based index of a timeline of the requested first media item, indicating one or more locations (e.g., times) preceding, following or within the first media item, where the supplemental content of the one or more selected second media items is to be presented to the user. Time-based index determination module 208 may determine the time-based index using time-based index data 230 of data store 220. In one example, time-based index data 230 may include a time-based index that is determined based on input of the content owner (e.g., based on the content owner interacting with a timeline of the first media item via the rule creation user interface).

In another example, the time-based index may be determined using a trained machine learning model. In such an example, a trained machine learning model may detect the optimal time to present the supplemental content of the second media item to the user. In one implementation, the trained machine learning model may be trained from data regarding multiple users that, responsive to requesting the first media item, consumed supplemental content of one or more selected second media items presented with the first media item. The data may include information regarding different locations on the timeline of the first media item where the supplemental content was presented to the user. The data may further include a success metric associated with each location, where the success metric indicates the number of users that performed an action prompted by the supplemental content. The data may also include information regarding one or more characteristics pertaining to one or more users that performed the prompted action. The machine learning model may be trained using the location data, the success metric data, and the one or more characteristic data. As a result, the trained machine learning model may be applied to current input data identifying the first media item, the selected second media item(s) and the user who has requested the first media item, in order to obtain an output that can specify or indicate an optimized location(s) on the timeline of the first media item for presentation of the supplemental content of the selected second media item(s). The time-based index may indicate the identified optimized location.

Upon selecting the one or more second media items, the requested first media item, the selected second media items, and the time-based index may be transmitted to the client device for presentation to the user. The supplemental content of the one or more selected media items may be presented to the user at the location(s) of the timeline of the first media item corresponding with the time-based index.

Data store 220 may include memory (e.g., random access memory), a drive (e.g., a hard drive, a solid state drive), a database system, a cache mechanism, or other type of component or device capable of storing data. Data store 220 may also include multiple storage components (e.g., multiple drives or multiple databases) that may span multiple computing devices (e.g., multiple server computers). In some implementations, data store 220 may be cloud-based. One or more of the components may utilize the data store 220 to store public and private data and data store 220 may be configured to provide secure storage for private data.

In situations in which the systems discussed herein collect personal information about users (characteristics and/or consumption history discussed above), or may make use of such personal information, the users may be provided with an opportunity to control whether systems, programs, or features described herein may enable collection of user information, or to control whether and/or how to receive content from the server that may be more relevant to the user. For example, a user may be provided with controls allowing the user to make an election as to both if and when systems, programs or features described herein may enable collection of user information, and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by server 106.

Figure 3:
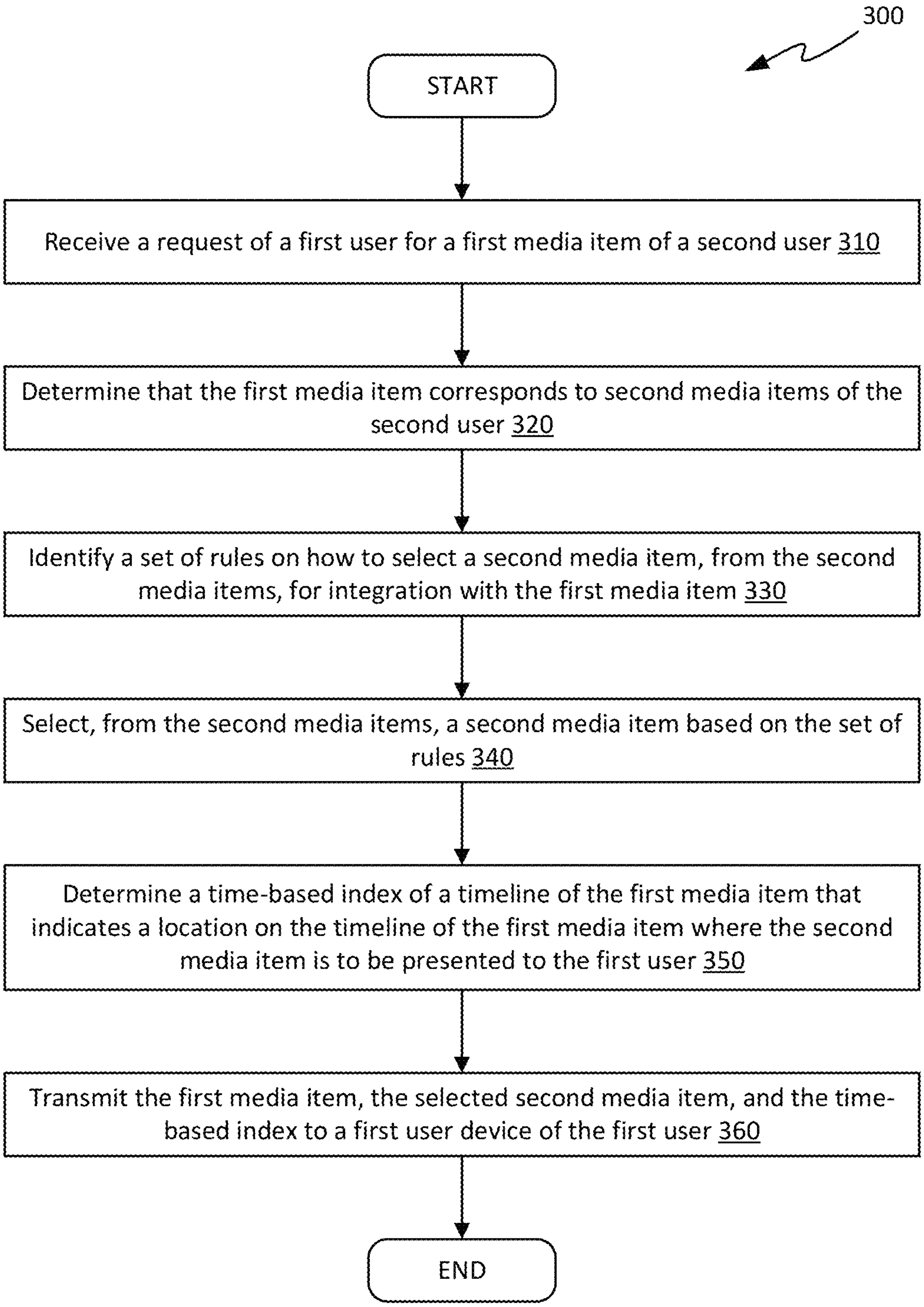
FIG. 3 illustrates a flow diagram of an example method for providing requested media items with integrated supplemental media items customized for requesting users, in accordance with some aspects of the present disclosure.
Figure 4:
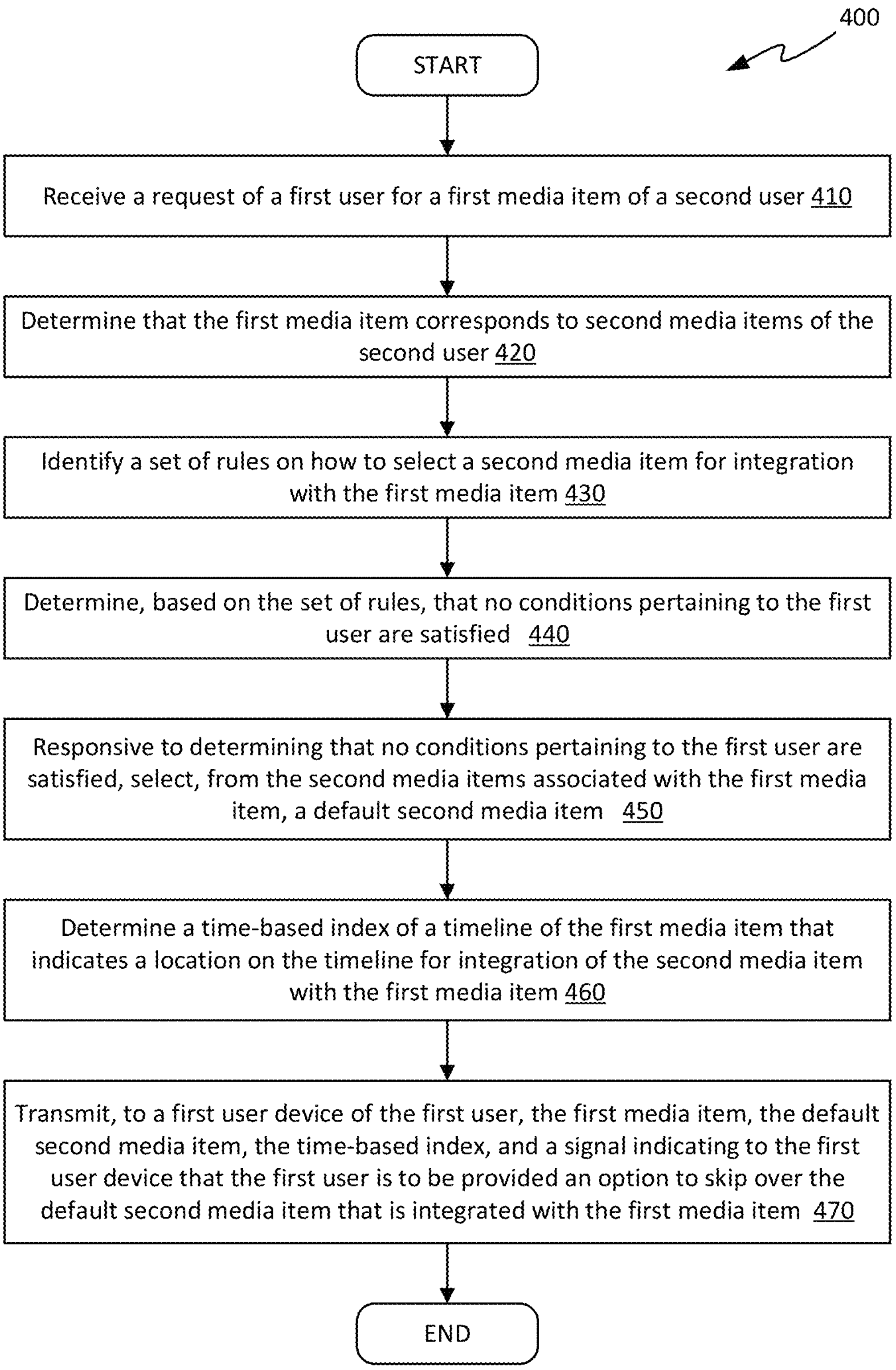
FIG. 4 illustrates a flow diagram of another example method for providing requested media items with integrated supplemental media items customized for requesting users, in accordance with some aspects of the present disclosure.
Figure 5:
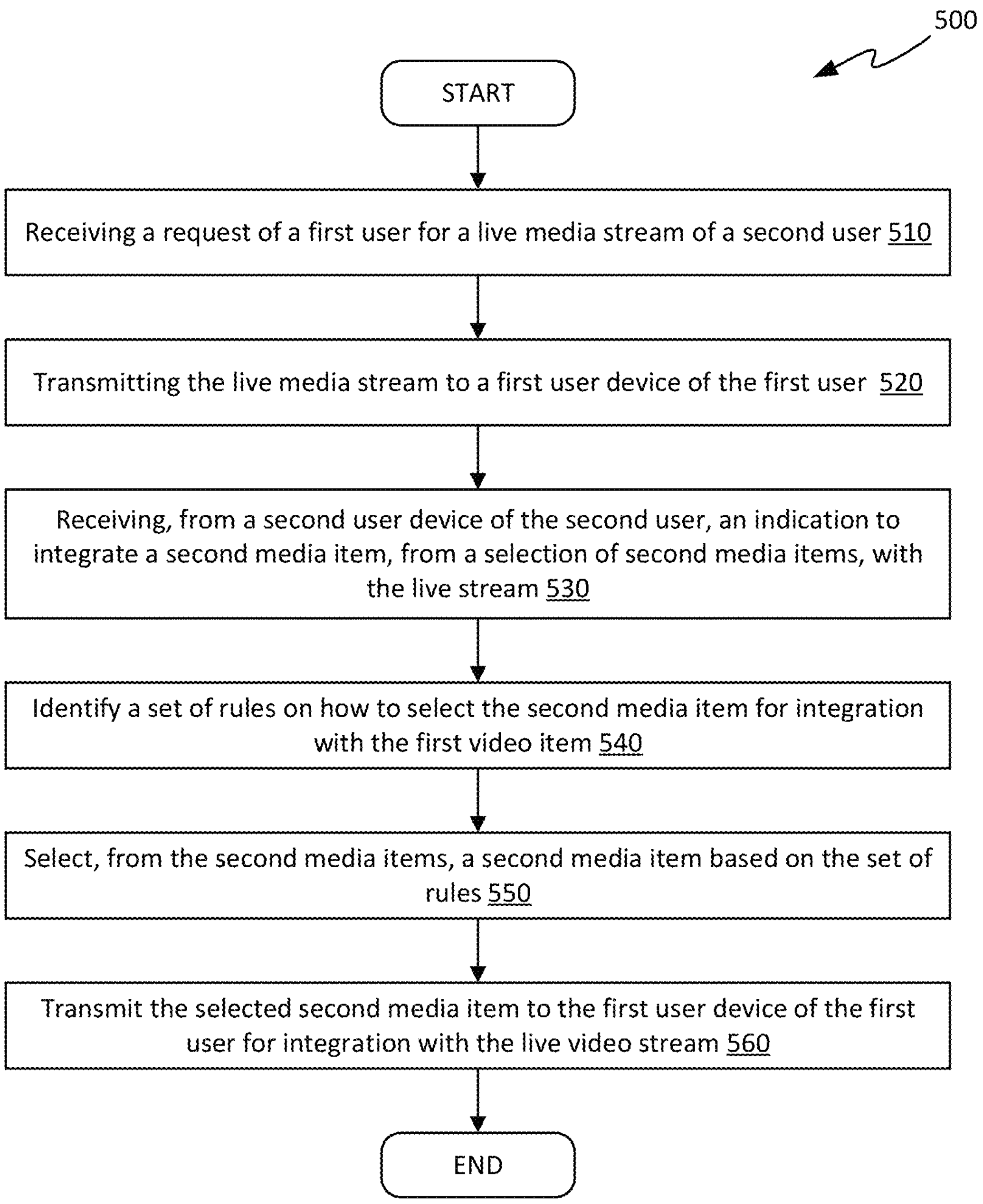
FIG. 5 illustrates a flow diagram of an example method for providing a live media stream with integrated supplemental content customized for a viewer of the live media stream, in accordance with some aspects of the present disclosure.

FIGS. 3-4 illustrate example methods for providing requested media items with supplemental media items customized for requesting users, in accordance with various aspects of the present disclosure. FIG. 5 illustrates a related example method for providing a live media stream with integrated supplemental content customized for a viewer of the live media stream, in accordance with various aspects of the present disclosure. For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass as computer program accessible from any computer-readable device or storage media.

Moreover, various acts have been described in detail above in connection with respective system diagrams. It is to be appreciated that the detailed description of such acts in prior figures can be and are intended to be implementable in accordance with the following methods.

The methods can be performed by processing logic that may include hardware (circuitry, dedicated logic, etc.), software (e.g., instructions run on a processing device), or a combination thereof. In some implementations, some or all the operations of the methods may be performed by server(s) 106 of FIG. 1.

Referring now to FIG. 3, a flow diagram illustrates an example method 300 for providing requested media items with integrated supplemental media items customized for requesting users, in accordance with some implementations of the present disclosure. At block 310, a request of a first user for a first media item of a second user is received. In some examples, the first user may be a viewer interacting with a user interface of a content sharing platform and the second user may be a content owner that provided the first video item to the content sharing platform. The request may include information regarding the first user that transmitted the request for the first media item. The request may include an identifier associated with the first user or a user device of the first user. In some implementations, the identifier may correspond to a user account of the first user (e.g., on the content sharing platform 120) that indicates or is associated with one or more characteristics associated with the first user. The user account may also indicate or be associated with a consumption history of the first user or a set of one or more media channels to which the first user has subscribed (i.e., opt-in to receive indications responsive to a media provider providing additional media items).

At block 320, it is determined that the first media item corresponds to second media items of the second user. The second media items may be provided by the second user with the first media item. Each of the second media items may include a distinct audio and/or video content. In some implementations, each of the second media items may include a message prompting an action from the first user. For example, a second media item may include a message prompting the first user to complete an action associated with the second media item, such as subscribing to a media channel of the second user, engaging with the first media item (e.g., selecting a "like" button included on a user interface displaying the first media item), etc. In another example, the message may prompt the first user to perform an action that pertains to the second user but is not associated with the first second media item, such as contributing to a fan funding campaign, purchasing merchandise sponsored by the second user, purchasing tickets to a live event featuring the second user, subscribing to a second media channel of the second user, purchasing merchandise endorsed by the second user, etc. Alternatively, a second media item may include a message from the second user thanking the first user for being a fan of the media items provided by the second user (without prompting the first user to perform an action).

At block 330, a set of rules is identified on how to select, from the second media items, a particular second media item that is relevant to the user who has requested the first media item. The set of rules may be provided by the second user with the first media item and the second media items. The set of rules may include one or more conditions pertaining to the first user, which may correspond with one or more characteristics indicated or associated with the identified user account. For example, one condition may relate to whether a user is a subscriber to a media channel of the second user, which, as discussed above, may be indicated by the user account of the first user.

In some implementations, the set of rules may further include a rule to select the second media item based on a set of rankings, where each of the second media items is associated with a ranking of the set of rankings. Each ranking associated with a second media item may correspond with an objective that the second user wishes to achieve. For example, the second user may wish to gain more subscribers to his or her video channel. A second media item that prompts the first user to subscribe to the video channel of the second user may, therefore, be selected to have the highest ranking by the second user.

At block 340, a second media item is selected from second media items based on the set of rules. In some implementations, the second media item that is associated with a highest ranking may be identified from the second media items. It may be determined whether the one or more conditions pertaining to the first user are satisfied with respect to the highest ranked second media item. In some implementations, one or more conditions pertaining to the first user may be satisfied based on a characteristic of the first user, consumption history of the first user and/or subscription data associated with the first user. For example, if the highest ranked second media item prompts the first user to subscribe to the video channel of the second user, a condition pertaining to the first user may be satisfied if the first user is not a subscriber of the media channel. If the one or more conditions pertaining to the first user are satisfied, the second media item may be selected for integration with the first media item.

In other implementations, a third media item may be associated with a highest ranking, which may be identified from the second media items. It may be determined whether the one or more conditions pertaining to the first user are satisfied with respect to the highest ranked third media item. If the one or more conditions pertaining to the first user are not satisfied with respect to the third media item, the second media item may be identified, where the second media item is associated with a lower ranking than the highest ranked third media item. It may be determined whether the one or more conditions pertaining to the first user are satisfied with respect to the second media item. If the one or more conditions pertaining to the first user are satisfied, the second media item may be selected for integration with the first media item. If the one or more conditions pertaining to the first user are not satisfied, a fourth media item may be identified, where the fourth media item is associated with a lower ranking than the ranking of the second media item. It may be determined whether one or more conditions pertaining to the first user are satisfied with respect to the fourth media item. This process may be performed iteratively until the one or more conditions pertaining to the first user are satisfied with respect to one of the second media items or a default second media item is selected. As discussed in more detail with respect to FIG. 4, a default second media item may be selected for integration with the first media item if no conditions pertaining to the first user are satisfied with respect to any of the ranked second media items.

At block 350, a time-based index of a timeline of the first media item is determined. The time-based index may indicate a location on the timeline of the first media item where the supplemental content of the selected second media item is to be presented to the first user. In some implementations, the time-based index may be created based on an interaction of the second user with the timeline of the first media item via a rule creation user interface. In other implementations, the time-based index may be determined by using a trained machine learning model, as discussed previously herein.

At block 360, the first media item, the selected second media item, and the time-based index are transmitted to a first user device of the first user. The first user device may integrate the selected second media item with the first media item such that the supplemental content is presented at a location of the first media item timeline corresponding with the time-based index. In some implementations, the first user device may render the first media item and the selected second media item as a combined media item. The combined media item may include the selected second media item integrated with the first media item, where a transition between the first media item and the second media item is not visible to the first user.

FIG. 4 illustrates a flow diagram of another example method 400 for providing requested media items with integrated supplemental media items customized for requesting users, in accordance with some implementations of the present disclosure. At block 410, a request of a first user for a first media item of a second user is received. The request may include information regarding the first user that transmitted the request for the first media item. In one implementation, the request may include an identifier associated with a user account of the first user.

At block 420, it is determined that the first media item corresponds to second media items of the second user. The second media items may be provided by the second user with the first media item. Each of the second media items may include distinct video and/or audio content. In some implementations, each of the second media items may include a message prompting an action from the first user.

At block 430, a set of rules is identified on how to select, from the second media items, a particular second media item that is relevant to the user who has requested the first media item. The set of rules may also be provided by the second user with the first media item and the second media items. The set of rules may include one or more conditions pertaining to the first user, which correspond with one or more characteristics indicated by or associated with the user account of the first user. In some implementations, the set of rules may further include a rule to select the second media item based on a set of rankings, where each of the second media items is associated with a ranking of the set of rankings. Each ranking associated with a second media item may correspond with an objective that the second user wishes to achieve (e.g., obtaining more subscribers to a media channel of the second user, etc.).

At block 440, it is determined, based on the identified set of rules, that no conditions pertaining to the first user are satisfied. The set of rules may be applied to each of the second media items in accordance with implementations previously described herein. In an illustrative example, the one or more conditions pertaining to the first user may relate to subscribing to a media channel of the second user, contributing to a fan funding campaign of the second user, and purchasing an item of merchandise from the second user. If the first user has previously subscribed to the media channel, contributed to the fan funding campaign, and purchased an item of merchandise of the second user, it may be determined that no conditions of the first user are satisfied.

At block 450, responsive to determining that no conditions pertaining to the first user are satisfied, a default second media item is selected from the second media items. The default second media item may be identified by the second user as the second media item to be selected responsive to a determination that no conditions pertaining to the first user are satisfied. In one example, the default second media item may include a message from the second user thanking the first user for being a fan of the media items provided by the second user. In other examples, the second user may designate any second media item of the second media items (including messages prompting the first user to perform an action) to be selected as the default second media item.

At block 460, a time-based index of a timeline of the first media item is determined. The time-based index may indicate a location(s) on the timeline of the first media item where the supplemental content of the selected second media item is to be presented to the first user. In some implementations, the time-based index may be created based on an interaction of the second user with the timeline of the first media item via a rule creation interface. In other implementations, the time-based index may be determined by using a trained machine learning model, as discussed previously herein.

At block 470, the first media item, the default second media item, and the time-based index may be transmitted to a first user device of the first user. In some implementations a signal may also be transmitted to the first user device indicating that the first user is to be provided an option to not watch and/or listen to (i.e., skip over) the supplemental content of the default second media item. The first user device may integrate the default second media item with the first media item such that the supplemental content is presented to the first user at a location of the first media item timeline corresponding with the time-based index. In some implementations, the first user device may render the first media item and the default second media item as a combined media item. As the first user consumes the combined media item, the first user device may provide, responsive to detecting a transition between the first media item and the default second media item, an option for the first user to not watch and/or listen to the content of the default second media item and continue watching and/or listening to the combined media item.

FIG. 5 illustrates a flow diagram of another example method 500 for providing a live media stream with integrated supplemental content customized for a viewer of the live media stream, in accordance with some implementations of the present disclosure. At block 510, a request of a first user for a live media stream of a second user is received. The request may include information regarding the first user that transmitted the request for the live media stream. In one implementation, the request may include an identifier associated with the first user. The identifier may correspond to a user profile of the first user that contains one or more characteristics associated with the first user. At block 520, the live media stream may be transmitted to a first user device of the first user.

At block 530, an indication to integrate a second media item from second media items associated with the live media stream may be received. The second media items may be provided by the second user prior to the first user requesting the live media stream. In some implementations, the indication may be received responsive to the second user interacting with a user interface element presented via a user interface on a second user device. In other implementations, the indication may be received responsive to detecting a time-based index corresponding with the timeline of the live media stream, where the time-based index is provided by the second user prior to the initiation of the live media stream.

At block 540, a set of rules is identified on how to select from the second media items, a particular second media item that is relevant to the user who has requested the live media stream. The set of rules may be provided by the second user prior to the first user requesting the live media stream. The set of rules may include one or more conditions pertaining to the first user, which correspond with one or more characteristics indicated by or associated with the user profile of the first user. In some implementations, the set of rules may further include a rule to select the second media item based on a set of rankings, where each of the second media items is associated with a ranking of the set of rankings. Each ranking associated with a second media item may correspond with an objective that the second user wishes to achieve.

At block 550, a second media item may be selected from the second media items based on the identified set of rules. The second media item may be selected in accordance with implementations discussed herein. At block 560, the selected second media item may be transmitted to the first user device of the first user for integration with the live video stream. In some implementations, the supplemental content of the selected second media item may be presented to the first user as part of the live media stream immediately as the selected second media item is received by the first user device.

Figure 6:
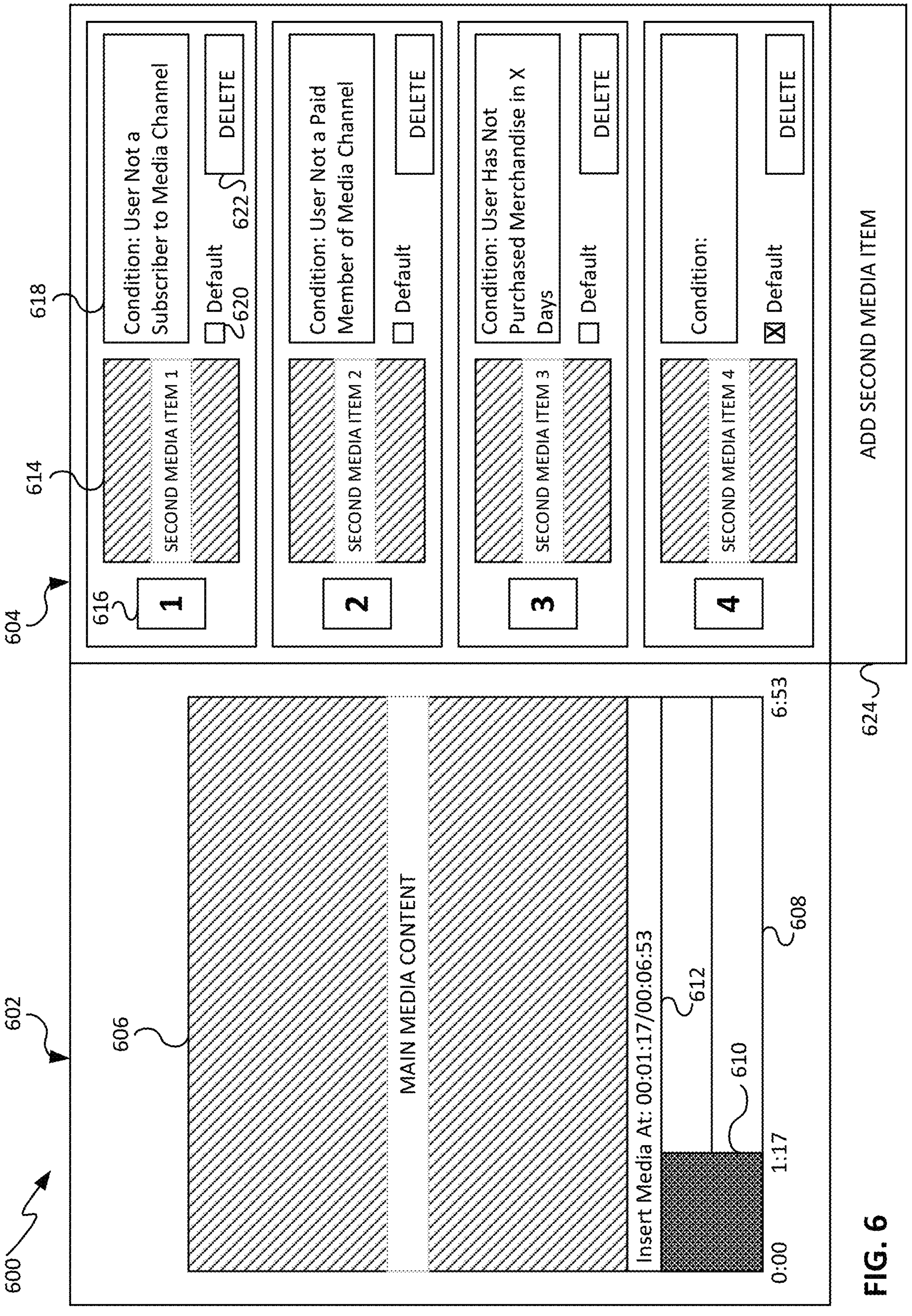
FIG. 6 illustrates a user interface facilitating dynamic integration of supplemental media content into main media content of a content owner, in accordance with some aspects of the present disclosure.

FIG. 6 illustrates a user interface 600 facilitating dynamic integration of supplemental media content into main media content of a content owner, in accordance with some aspects of the present disclosure. User interface 600 may correspond to rule creation user interface described with respect to FIG. 2.

User interface 600 may include a first portion 602 and a second portion 604. Main media content 606 (the first media item) may be presented via the first portion 602. The main media content 606 may be associated with a timeline 608, where the timeline 608 indicates the duration of the first media item, beginning at a time stamp of 0:00 and ending at a time stamp indicating the completion of the main media content 606. For example, if the first media item has a duration of 6 minutes and 53 seconds, the time stamp indicating the completion of the main media content 606 may read "6:53", as shown in FIG. 6. The user of a content sharing platform (i.e., a content owner) may select a time-based index 612 indicating a location on the timeline 608 where the content of a second media item is to be presented to a viewer and/or listener. In one implementation, the user may interact with a slide bar element 610, wherein the user may move the slide bar element 610 along the length of the timeline 608 to identify the time-based index 612. The time-based index 612 may change as the user moves the slide bar element 610 along the length of the timeline 608.

The second portion 604 of user interface 600 may present second media items 614 as provided by the user. The second portion 604 may further include one or more user interface elements to allow the user to provide the set of rules for selecting a second media item 614 for integration with the first media item. The user interface elements may include a ranking element 616, a user condition element 618, and a default selection element 620. The ranking element 616 may allow the user to select a ranking for association with a second media item 614. In some implementations, the ranking element 616 may be a text box. The user condition element 618 may allow the user to provide one or more conditions for selection of the second media item 614. In some implementations, the user condition element 618 may be a text box. In some implementations, the user may provide the conditions for selecting the second media item 614 for integration with the first media item. In other implementations, the user may choose from a selection of conditions provided by the content sharing platform. The default selection element 620 may allow the user to select a default second media item 614. As depicted, the default selection element 620 may be a check box, where the user selects the check box to indicate a second media item 614 is a default second media item.

The second portion 604 of user interface 600 may further include one or more delete buttons 622 for each second media item 614. The user may select the delete button 622 associated with a second media item 614 to remove the second media item 614 from the second media items. The second portion 604 of user interface 600 may further include an add button 624 which allows the user to add a second media item 614 to the second media items Although the above description includes references to certain user interface elements included in either the first portion 602 or the second portion 604 of user interface 600, it is to be understood that such references are provided for the purpose of explanation and are not considered to be limiting. Any of the above described user interface elements may be any one of a variety of user interface elements including, but not limited to a text field, a drop down list, a check box, etc.

Figure 7:
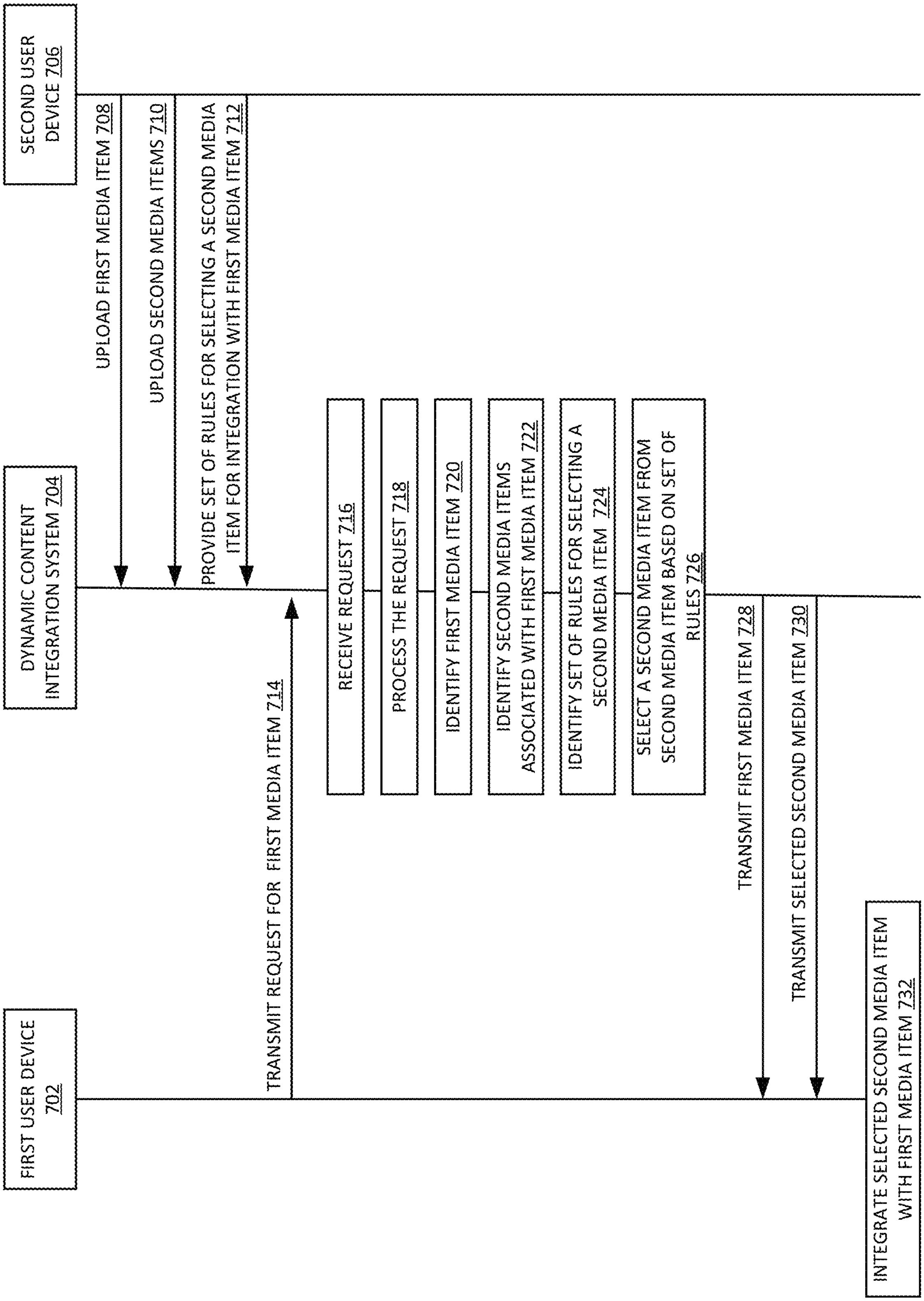
FIG. 7 illustrates an interaction diagram between a first user device, a second user device and a dynamic content integration system to provide dynamic integration of supplemental media content into main media content of a content owner, in accordance with some aspects of the present disclosure.

FIG. 7 illustrates an interaction diagram between a first user device 702, a second user device 706, and a dynamic content integration system 704 to provide dynamic integration of supplemental media content into main media content of a content owner, in accordance implementations of the present disclosure. The second user device 706 provides 708 a first media item for upload to the dynamic content integration system 704, according to one implementation. The dynamic content integration system 704 may correspond to the dynamic content integration system 108 of FIG. 1. The second user device 706 may also provide 710 one or more second media items for upload to the dynamic content integration system 704. The second user device 706 may provide the first media item and the one or more second media items from the content store 118 on the client device 110A via the network 105.

The second user device 706 may further provide 712 a set of rules for selecting a second media item for integration with the first media item. The set of rules may be provided via user interface 600 of FIG. 6. In some implementations, the second user device may further provide (not shown) a time-based index indicating a location on a timeline of the first media item where the second media item is to be presented to a first user. In some implementations, the first media item, the second media items, the set of rules, and the time-based index may be stored in a data store (e.g., data store 220 of FIG. 2) of the dynamic content integration system 704.

The first user device 702 may access the first media item by transmitting 714 a request for the first media item to the dynamic content integration system 704. The first user device 702 may access the dynamic content integration system 704 via the network 105 using the user interface 114 of communication application 112. Accessing the first media item can occur by entering (e.g., into the user interface 114) an identifier of the location of the first media item stored in the data store.

The dynamic content integration system 704 may receive 716 the request for the first media item from the first user device 702. The dynamic content integration system 704 may process 718 the request to determine that a first media item is to be provided to the first user device 702. The media hosting service 704 may identify 720 the first media item stored in a data store (e.g., data store 220). Responsive to identifying 720 the first media item, the dynamic content integration system 704 may identify 722 second media items associated with the first media item from the data store. The dynamic content integration system 704 may further identify 724 the set of rules for selecting a second media item from the second media items. Responsive to identifying the set of rules, the dynamic content integration system 704 may select the second media item from the second media items, based on the identified set of rules.

Responsive to selecting the second media item, the dynamic content integration system 704 may transmit 728 the first media item and transmit 730 the selected second media item to the first user device 702 for presentation to a first user. In some implementations, the dynamic content integration system 704 may also transmit a time-based index indicating a location on the timeline of the first media item where the supplemental content of the selected second media item is to be presented to the first user. Responsive to receiving the first media item, the selected second media item, and the time-based index, the first user device 702 may integrate 732 the selected second media item with the first media item at the location of the first media item timeline corresponding with the time-based index.

Figure 8:
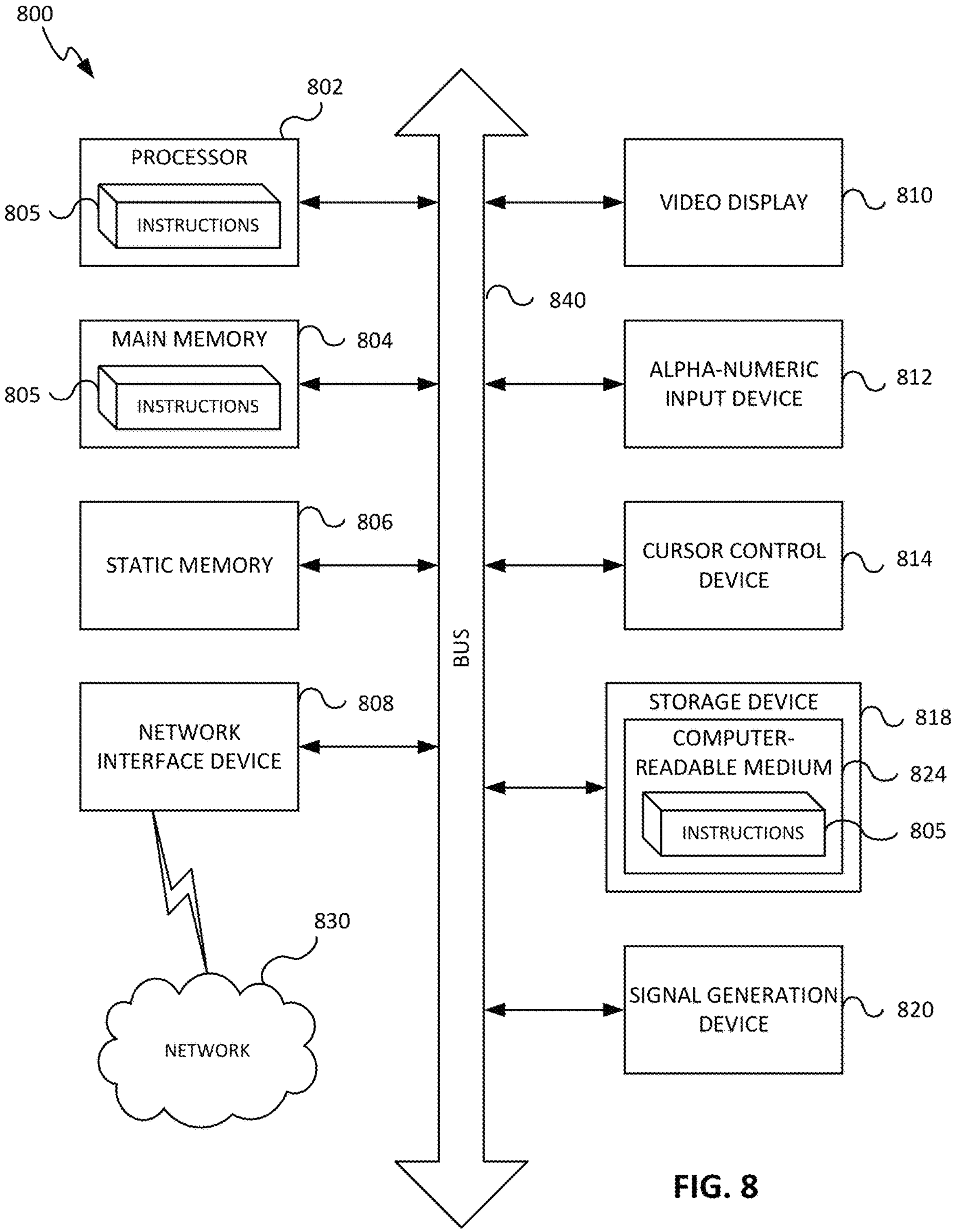
FIG. 8 illustrates an example block diagram of a computing device operating in accordance with one or more aspects of the present disclosure.

FIG. 8 illustrates an example block diagram of a computing device operating in accordance with one or more implementations of the present disclosure. The computer system 800 can be server 106 or client device 110A-110Z in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 818, which communicate with each other via a bus 840.

Processor (processing device) 802 represents one or more general-purpose processing devices such as a microprocessor, central processing unit, or the like. More particularly, the processor 802 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 802 is configured to execute instructions 805 (e.g., of communication application 112) for performing the operations discussed herein.

The computer system 800 can further include a network interface device 808. The computer system 800 also can include a video display unit 810 (e.g., a liquid crystal display (LCD) or a cathode ray tube (CRT)), an input device 812 (e.g., a keyboard, and alphanumeric keyboard, a motion sensing input device, touch screen), a cursor control device 814 (e.g., a mouse), and a signal generation device 820 (e.g., a speaker).

The data storage device 818 can include a non-transitory machine-readable storage medium 824 (also computer-readable storage medium) on which is stored one or more sets of instructions 805 (e.g., of communication application 112) embodying any one or more of the methodologies or functions described herein. The instructions can also reside, completely or at least partially, within the main memory 804 and/or within the processor 802 during execution thereof by the computer system 800, the main memory 804 and the processor 802 also constituting machine-readable storage media. The instructions can further be transmitted or received over a network 830 via the network interface device 808.

In one implementation, the instructions 805 include instructions for providing requested media items with supplemental media items customized for requesting users. While the computer-readable storage medium 824 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A computer-implemented method comprising:

receiving a request of a first user for a first media item of a second user, wherein the first media item is associated with a set of rules on how to select one or more additional media items corresponding to the first media item, the set of rules provided by the second user and comprising one or more conditions pertaining to users requesting access to the first media item;

determining whether one or more conditions defined by the set of rules and pertaining to the first user are satisfied with respect to a second media item of the one or more additional media items; and responsive to determining that the one or more conditions are satisfied, providing the second media item for presentation via a first user device associated with the first user.

2. The method of claim 1, wherein the one or more additional media items comprise at least one of distinct video content and distinct audio content.

3. The method of claim 1, wherein the set of rules on how to select the one or more additional media items corresponding to the first media item comprises a rule to select the second media item based on a set of rankings provided by the second user, wherein each of the one or more additional media items is associated with a ranking of the set of rankings.

4. The method of claim 3, wherein determining whether one or more conditions defined by the set of rules and pertaining to the first user are satisfied with respect to the second media item comprises:

identifying, from the one or more additional media items, the second media item that is associated with a highest ranking.

5. The method of claim 3, wherein determining whether one or more conditions defined by the set of rules and pertaining to the first user are satisfied with respect to the second media item comprises:

identifying, from the one or more additional media items, a third media item that is associated with a highest ranking;

determining that the one or more conditions pertaining to the first user are not satisfied with respect to the third media item;

identifying, from the one or more additional media items, the second media item that is associated with a lower ranking than the third media item associated with the highest ranking; and determining that the one or more conditions pertaining to the first user are satisfied with respect to the second media item.

6. The method of claim 1, wherein the first user device is to render the first media item and the second media item as a combined media item, wherein the second media item is to be integrated with the first media item, and wherein a transition between the first media item and the second media item is not visible to the first user.

7. The method of claim 1, comprising:

determining a time-based index of a timeline of the first media item, wherein the time-based index indicates a location on the timeline of the first media item corresponding to the second media item; and transmitting the time-based index to the first user device of the first user.

8. The method of claim 7, wherein the time-based index of the timeline of the first media item is created based on interaction of the second user with the timeline of the first media item.

9. The method of claim 7, wherein the time-based index of the timeline of the first media item is determined using a trained machine learning model.

10. The method of claim 1, wherein the first media item comprises a live media stream, and wherein transmitting the first media item and the second media item to the first user device of the first user comprises:

transmitting the live media stream to the first user device of the first user;

receiving, from a second user device of the second user, an indication to integrate the second media item with the live media stream; and responsive to receiving the indication to integrate the second media item with the live media stream, transmitting the second media item to the first user device of the first user, wherein the second media item is to be integrated with the live media stream.

11. A system comprising:

a memory; and a set of one or more processing devices coupled to the memory, wherein the set of one or more processing devices is to perform operations comprising:

receiving a request of a first user for a first media item of a second user, wherein the first media item is associated with a set of rules on how to select one or more additional media items corresponding to the first media item, the set of rules provided by the second user and comprising one or more conditions pertaining to users requesting access to the first media item;

determining whether one or more conditions defined by the set of rules and pertaining to the first user are satisfied with respect to a second media item of the one or more additional media items; and responsive to determining that the one or more conditions are satisfied, providing the second media item for presentation via a first user device associated with the first user.

12. The system of claim 11, wherein the one or more additional media items comprise at least one of distinct video content and distinct audio content.

13. The system of claim 11, wherein the set of rules on how to select the one or more additional media items corresponding to the first media item comprises a rule to select the second media item based on a set of rankings provided by the second user, wherein each of the one or more additional media items is associated with a ranking of the set of rankings.

14. The system of claim 13, wherein determining whether one or more conditions defined by the set of rules and pertaining to the first user are satisfied with respect to the second media item comprises:

identifying, from the one or more additional media items, the second media item that is associated with a highest ranking.

15. The system of claim 11, wherein determining whether one or more conditions defined by the set of rules and pertaining to the first user are satisfied with respect to the second media item comprises:

identifying, from the one or more additional media items, a third media item that is associated with a highest ranking;

determining that the one or more conditions pertaining to the first user are not satisfied with respect to the third media item;

identifying, from the one or more additional media items, the second media item that is associated with a lower ranking than the third media item associated with the highest ranking; and determining that the one or more conditions pertaining to the first user are satisfied with respect to the second media item.

16. A method comprising:

transmitting, by a client device associated with a first user of a platform, a request for a first media item of a second user of the platform;

receiving, by the client device, the first media item and one or more second media items of the second user of the platform, the one or more second media items corresponding to the first media item;

determining, by the client device and based on a set of rules defined by the second user of the platform, a location of a timeline of the first media item where at least one of the one or more second media items is to be integrated;

initiating a playback of the first media item via a user interface UI of the client device; and upon detecting that a time period of the playback of the first media item corresponds to the determined location of the timeline of the first media item, providing the at least one of the one or more second media item for presentation via the UI.

17. The method of claim 16, wherein the one or more second media items comprise at least one of distinct video content and distinct audio content.

18. The method of claim 16, wherein the set of rules defined by the second user of the platform comprises a time-based index of the timeline of the first media item.

19. The method of claim 18, wherein the location of the timeline of the first media item corresponds to the time-based index of the set of rules.

20. The method of claim 16, wherein the first media item comprises a live media stream.

* * * * *